US011222112B1

(12) United States Patent
Satpathy et al.

(10) Patent No.: US 11,222,112 B1
(45) Date of Patent: Jan. 11, 2022

(54) SIGNATURELESS DETECTION OF MALICIOUS MS OFFICE DOCUMENTS CONTAINING ADVANCED THREATS IN MACROS

(71) Applicant: Netskope, Inc., Santa Clara, CA (US)

(72) Inventors: Ghanashyam Satpathy, Bangalore (IN); Benjamin Chang, Fremont, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/184,478

(22) Filed: Feb. 24, 2021

(51) Int. Cl.
*H04N 7/16* (2011.01)
*G06F 7/04* (2006.01)
(Continued)

(52) U.S. Cl.
CPC .............. *G06F 21/56* (2013.01); *G06F 21/53* (2013.01); *G06N 5/003* (2013.01); *G06N 20/00* (2019.01)

(58) Field of Classification Search
CPC ......... G06F 21/56; G06F 21/53; G06N 20/00; G06N 5/003
(Continued)

(56) References Cited

U.S. PATENT DOCUMENTS

| 5,960,170 A * | 9/1999 | Chen ..................... H04L 63/145 |
| | | 714/38.14 |
| 8,813,222 B1 * | 8/2014 | Codreanu ............... G06F 21/56 |
| | | 726/22 |

(Continued)

OTHER PUBLICATIONS

Daniel Gibert; A Hierarchical Convolutional Neural Network for Malware Classification; IEEE:2019;; pp. 1-8.*

(Continued)

*Primary Examiner* — Monjur Rahim
(74) *Attorney, Agent, or Firm* — Haynes Beffel & Wolfeld, LLP; Ernest J. Beffel, Jr.

(57) ABSTRACT

The technology disclosed relates to cybersecurity attacks and cloud-based security. The technology disclosed is a method and apparatus for detecting documents with embedded threats in the form of malicious macros and malicious OLE objects. The technology disclosed detects obfuscated malicious code using a trained machine learning model to predict documents having malicious code without a known signature. The technology disclosed can thus predict which documents include signatureless malicious code. Feature engineering is used to define a set of features for detecting malicious macros and malicious OLE objects, based on features selected from a list of known characteristics and attributes possessed by files that have historically indicated malicious content. The selected features are used to train a supervised machine learning model. In another aspect, an office classifier receives incoming documents over a network, parses those documents, and applies the machine learning algorithm to classify the documents as to threat level, as safe, suspicious, or malicious. Safe documents are allowed into the network. Suspicious documents are subjected to additional processing, including quarantining or sandboxing methods. Malicious documents are rejected from the network. In a further aspect, the disclosed technology combines machine learning with other network security methods, to further increase the capability of a network security system to detect malicious macros and malicious OLE files.

12 Claims, 7 Drawing Sheets

(51) Int. Cl.
  *G06F 21/56* (2013.01)
  *G06N 5/00* (2006.01)
  *G06N 20/00* (2019.01)
  *G06F 21/53* (2013.01)

(58) Field of Classification Search
  USPC .......................................................... 726/24
  See application file for complete search history.

(56) References Cited

U.S. PATENT DOCUMENTS

| | | | |
|---|---|---|---|
| 9,438,613 B1 | 9/2016 | Paithane et al. | |
| 9,690,933 B1 | 6/2017 | Singh et al. | |
| 10,009,370 B1* | 6/2018 | Douglas | G06F 21/563 |
| 10,050,998 B1* | 8/2018 | Singh | H04L 63/145 |
| 10,581,874 B1* | 3/2020 | Khalid | G06F 21/562 |
| 10,805,314 B2* | 10/2020 | Jakobsson | H04L 51/30 |
| 10,817,607 B1* | 10/2020 | M | G06F 21/554 |
| 2010/0162400 A1* | 6/2010 | Feeney | G06F 21/563 726/24 |
| 2015/0261955 A1* | 9/2015 | Huang | G06F 21/562 726/23 |
| 2019/0222591 A1* | 7/2019 | Kislitsin | G06F 9/45558 |
| 2019/0236273 A1* | 8/2019 | Saxe | G06F 21/56 |
| 2020/0012789 A1* | 1/2020 | Usui | H04L 63/1433 |
| 2020/0042708 A1 | 2/2020 | Usui et al. | |
| 2020/0089880 A1* | 3/2020 | De Los Santos Vilchez | G06F 21/562 |
| 2020/0233962 A1* | 7/2020 | Chantry | G06F 8/311 |
| 2020/0250309 A1* | 8/2020 | Harang | G06F 21/563 |
| 2020/0396190 A1* | 12/2020 | Pickman | H04L 67/306 |
| 2020/0412740 A1* | 12/2020 | Goutal | H04L 51/18 |
| 2021/0058395 A1* | 2/2021 | Jakobsson | H04L 63/0884 |

OTHER PUBLICATIONS

"Data Loss Prevention and Monitoring in the Cloud" by netSkope, Inc., Nov. 2014, 18 pgs.
"Netskope Active Cloud DLP," netSkope, Inc., 2015, 4 pgs.
"Repave the Cloud-Data Breach Collision Course," netSkope, Inc., 2014, 6 pgs.
"The 5 Steps to Cloud Confidence," netSkope, Inc., 2014, 11 pgs.
"Netskope Cloud Confidence Index™," netSkope, Inc., 2015, 2 pgs.
"Netskope Inkrospection," netSkope, Inc., 2015, 3 pgs.
"Cloud Data Loss Prevention Reference Architecture", Sep. 2015, Netskope, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope, Inc., EB-141-1, 19 pages.
Cheng et al, "Cloud Security for Dummies, Netskope Special Edition" John Wiley & Sons, Inc. 2015, 53 pages.
U.S. Appl. No. 17/184,502, filed Feb. 24, 2021, Pendning.
U.S. Appl. No. 17/184,502—Nonfinal Office Action dated Jun. 2, 2021, 25 pages.

\* cited by examiner

SIGNATURELESS DETECTION OF MALICIOUS MS OFFICE DOCUMENTS CONTAINING ADVANCED THREATS IN MACROS

FIELD OF THE TECHNOLOGY DISCLOSED

The technology disclosed relates to cybersecurity attacks and cloud-based security, and more specifically a system and method for preventing malware attacks where Microsoft Office Documents act as the primary vector for delivering malicious code in the form of macros and OLE objects. In addition, the technology disclosed relates to the detection of documents that include malicious macros and malicious OLE objects that do not contain known signatures. In the context of the technology disclosed, signatureless refers to detecting malicious macros and malicious OLE objects that do not have previously established signatures. Furthermore, the technology disclosed uses machine learning and feature engineering to predict the presence of malicious macros and malicious OLE objects in MS Office documents and other document types, without need for the malicious code to have been previously known.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In the six months prior to the COVID-19 pandemic, Microsoft Office files accounted for only 5% of the Trojans and downloaders detected on the Netskope Security Cloud platform. After COVID, especially when EMOTET became active again, that percentage increased to nearly 45%, while portable executable files and other types decreased. Microsoft Excel files—typically containing malicious links, VBA scripts, or PowerShell scripts—account for nearly three-quarters of the malicious Office documents detected, often incorporating malicious macros. More than 90% of the malicious Office documents are distributed through cloud applications, compared to 50% of all other malicious file types.

Authors of malware code have become increasingly clever in finding ways to deliver a malware payload into a secure network using MS Office. Documents with malware use advanced techniques of obfuscation to hide the malicious code so that it cannot be easily detected and often go unnoticed until they do severe damage to the network.

There is a need for detecting obfuscated macros and OLE objects delivered through Microsoft Office documents files that follow a VBA document object model, using feature engineering combined with machine learning to predict malicious content MS Office files. This problem is solved by feature engineering in which the features are determined by a network security system such as Netskope which is then used to train a supervised machine learning algorithm to predict and distinguish between: legitimate or safe documents; suspicious documents that may include malware, and malicious documents that definitely do include malicious code.

In this way, network devices may predict the presence of malware in document files without using a known signature for the unknown malware. Additionally, the detection of malicious office files may happen in near real-time, greatly improving network security while having reduced negative impact on system throughput, by reducing latencies in network security processing time.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

INTRODUCTION

The technology disclosed relates to a feature engineering approach for machine learning based classification for Microsoft Office documents, which will significantly improve malicious file detection efficiency or documents that include macros and OLE objects.

The technology disclosed relates to cybersecurity attacks and cloud-based security. The technology disclosed is a method and apparatus for detecting documents with embedded threats in the form of malicious macros and malicious OLE objects. The technology disclosed detects obfuscated malicious code using a trained machine learning model to predict documents having malicious code without a known signature, called signatureless. The technology disclosed can thus predict which documents include signatureless malicious code. Feature engineering is used to define a set of features for detecting malicious macros and malicious OLE objects, based on features selected from a list of known characteristics and attributes possessed by files that have historically indicated malicious content. In one aspect, the characteristics and attributes of macro malware and OLE malware is determined by analysis of obfuscated malware code and are stored in a heuristic database. Features from the database are selected and used to train a supervised machine learning model.

In another aspect, an office classifier receives incoming documents over a network, parses those documents, and applies the machine learning algorithm to classify the documents as to threat level—as safe, suspicious, or malicious. Safe documents are allowed into the network. Suspicious documents are subjected to additional processing, including quarantining or sandboxing methods. Malicious documents are rejected or blacklisted from the network.

In a further aspect, the disclosed technology combines machine learning with other network security methods, serially or in tandem, to further increase the capability of a network security system to detect malicious macros and malicious OLE files.

Most malware detection systems in use today rely on signature-based detection methods. In signature-based detection methods, a malware or virus has a unique code pattern that can be used to detect and identify a specific malware or virus. The antivirus software scans file signatures and compares them to a database of known malicious codes. If they match, the file is flagged and treated as a threat. The major limitation of signature-based detection is that it is only capable of flagging already known malware, making it completely useless against new malware or zero-day attacks.

The method and apparatus of the present invention is advantageously used at least with the following file formats for MS Office documents: Word 97-2003 (.doc, .dot); Word 2007+(.docx, .docm, .dotm); Word 2003 XML (.xml); Excel 97-2003 (.xls); Excel 2007+(.xlsx, .xlsm, .xlsb); and PowerPoint 2007+(.pptx, .pptm, .ppsm).

MS Office documents can contain embedded code such as VBA (Visual Basic for Applications), DDE (Dynamic Data Exchange) and other files (jpg, mpeg, exe/pe files, etc.). In one aspect, the overall objective of the disclosed technology is to scan the embedded content of the MS Office files to detect any malicious code within the files, based on the functionality of the code.

Macro Malware

Macros are a powerful way to automate common tasks in Microsoft Office and can make users more productive. However, macro malware uses this functionality to infect users' endpoint devices. Macro malware are often disguised inside in Microsoft Office files and delivered via email attachments, ZIP files or downloaded from cloud-based sources.

In the past, macro malware was common because macros ran automatically whenever a document was opened. In more recent versions of Microsoft Office, macros are disabled by default. Now, malware authors need to lure users into turning on macros so that their malware can run. These files use names that are intended to entice or "scare" users into opening them. Some files are disguised to look like official documents such as invoices, receipts, and legal documents. Other files often show fake warnings when a malicious document is opened to lure a user into accessing the malicious content.

Many families of malware, like EMOTET, ICEDID, DRIDEX, etc., use MS Office Documents as the vehicle for distribution, particularly because of the popularity of MS Office applications across a large user base in both Windows and Mac computers. The malware family EMPYRE is an example of a document macro exploiting Mac computers.

Macros are programs that are embedded in MS Office documents. All types of MS Office formats (documents, spreadsheets, presentations, etc.) have an ability to include these macros. Macros written in VBA (Visual Basic for Applications) enable the user to build user-defined functions (UDFs), automating processes and accessing Windows API and other low-level functionality through dynamic-link libraries (DLLs). Malware authors utilize this functionality to carry out malicious activity on a user's computer. Macros are stored in a file folder. VBA components, in turn, are stored in a sub-folder. The VBA components can be considered streams, including a VBA project, directory, and reference to the document.

Javascript/JScript Macros

Visual basic can be used to launch embedded JavaScript (JScript) code. In Windows, cscript.exe at the command line and wscript.exe running in the GUI are the main means of implementation of installed active script languages. A Windows script file (.wsf) is an xml file that can contain more than one script in more than one language in addition to other elements and are executed by the Windows script host.

Sample (Non-Malware) JScript MS Excel Macro

VBA is a very powerful language, beyond its native syntax, because it can invoke a component object model library, a .net library or any Windows interface. By invoking external program modules, VBA can realize the full capabilities of any windows programming language.

The following sample xlsm file and macro demonstrates creating a JScript macro in VBA for inside an Office document. This feature can be used to construct executable VBA during runtime, which is difficult to scan for maliciousness. A core snippit would appear as follows:

Dim b As String
b="function addIt(a,b) {return (a+b); }"
Set sc1=CreateObject("MSScriptControl.ScriptControl")
  sc1.Language="JScript"
sc1.AddCode b
MsgBox sc1.Run("addIt", 8, 16)

The JScript is specified in a variable. The Script Control is instantiated and set to JScript. VBScript is a language which allows embedding of JScript in VBScript code. This is how JScript code can be constructed and executed by VBScript code. The resulting JScript is outside the capability of any current Microsoft malicious code detection and mitigation mechanisms.

Mechanisms Exploited in Malicious Embedded Macros in MS Office DOCS

Malicious macros can be triggered automatically when an MS Office file is opened or closed. The triggering functions provided by the VBA API include Document_Open, Auto_Open, Workbook_Open, Document_Close, Workbook_Close and a handful of similar condition-invoked APIs. For instance, the keyword or API Document_Open causes VBA code to be executed when the document containing this macro is first opened. This API was designed by Microsoft for a useful purpose, but it is subject to abuse in malicious and hijacked documents.

Every malicious macro needs to act on the underlying system. To accomplish this, it can drop a malicious payload either as a file or as a shellcode injected into another process. It then triggers the execution of that payload in some way. Most macros do both, but a few samples manage to deliver their payload with only a write operation or an execute operation.

A significant number of the macros observed since 2014 download their payload using HTTP. But this is not always the case: some macros include the payload encoded in the VBA code or in the document. Download actions are not discriminant enough to be used for detection. Some legitimate macros may use the same features as malicious macros, but it is unlikely that such a macro would combine all of those methods mentioned above.

Obfuscation

Most malicious macros are obfuscated. Malicious authors use various techniques in order to hide the behavior of macros and of avoid code strings that would help in analysis and detection, i.e., indicators of compromise (IOCs) such as IP addresses, URLs, etc. Fortunately, many VBA keywords used by malware must appear in clear text, though parameters can be strings. The clear text mechanisms for automatic triggers, payload dropping, and payload execution cannot be obfuscated, because they cannot be executed from strings. VBA does not provide the ability to run code stored in a string, in contrast to JavaScript with eval( ) and VBScript with Execute.

For more effective detection, based on studies of malicious VBA code, obfuscation methods may be classified into four types, which are described below:
1) Random obfuscation
2) Split obfuscation
3) Encoding obfuscation
4) Logic obfuscation Each obfuscation type has a different syntactic structure and different uses of functions and operators. Feature extraction from the VBA macro, as described further on, is directed to the four types of obfuscation. Features that characterize obfuscation in these four categories build on the following analysis. The basic purpose of using these obfuscation techniques is to decelerate the time of analysis, which in turn delays the countermeasures after detection. Although each obfuscation method is quite simple, when used in combination, they render the code visually indecipherable.

In addition, malware authors use obfuscation tools to create many variants of malware with different hash values, which can serve as serve as a digital footprint for files in which a file is processed through a cryptographic algorithm, yielding a unique numerical value for that file.

Random Obfuscation

Random Obfuscation makes VBA code unreadable by using nonsense or misleading token names. This random obfuscation can be characterized by features that use Shannon Entropy measures of the VBA code.

An Example of Random Obfuscation: Function and Variable Names are Just Random Characters.
/* Procedure/Function name is changed to "wiefigdhkfysv"
Public Sub wiefjgdhkfysv( )
/* Variable name is changed to "reufhjdmmz"
Dim reufhjdmmz As Integer
reufhjdmmz=2
Do While reufhjdmmz <45
DoEvents: reufhjdmmz=reufhjdmmz+1
End Sub Split Obfuscation Split obfuscation is used to piece together strings, such as filename strings or URLs, that are different than they initially appear. Split obfuscation can be characterized by counting numbers of occurrences of string operators such as '+', '=' or '&', These operators can be used to obscure malicious code.

An Example of Split Obfuscation: Splits the Data into Multiple Variables/Constants
Public Const pgooda="a"
Public Const pgoode="e"
Public Const pgoodP="P"
/* Parameter "wScript.shell" is divided
CreateObject("WScript.Sh"+pgoode+"11")
/* Parameter "Process" is divided
Environment(pgoodP+" "+"roc"+pgoode+"ss")
Obfuscation Using Built-in Function Replace( )/split( ): Uses VBA Built-in Functionality Such as Replace/split in Obfuscating the Data.
/* Parameter "savetofile" is changed to "savzeMNtofilzeMN"
Replace ("savzeMNtofilzeMN", "zeMN", "e")
/* winmgmt keyword prefix for WMI objects extracted Using Split
Qxkjmji8kru6j6qg="6237862378w62378i62378nm6237862378gm62378t6237862378"
O59swm8t67fn_x=Split (Qxkjmji8kru6j6qg, "62378")

Encoding Obfuscation

Encoding obfuscation operates on parameters to produce malicious code that is much different than it initially appears. Examples of functions, by category, that produce encoding obfuscation include:
(text functions): Asc( ), Chr( ), Mid( ), Join( ), InStr( ), Replace( ), Right( ), StrConv( ), etc.
(arithmetic functions): Abs( ), Atn( ), Cos( ), Exp( ), Log( ), Randomize( ), Round( ), Tan( ), Sqr( ), etc.
(type conversion functions): CBool( ), CByte( ), CChar( ), CStr( ), CDec( ), CUInt( ), CShort( ), etc.
(financial functions): DDB( ), FV( ), IPmt( ), PV( ), Pmt( ), Rate( ), SLN( ), SYD( ), etc.

Logic Obfuscation

Logic obfuscation complicates the code and makes analysis more difficult. This technique is performed by declaring unused variables or using redundant function calls and loops. The following snippet extracted for a sample shows only one line of code is responsible for creating an OLE object, while the rest are non-operative.
Function ICREJdtoccujwnuvg(YQFBJyluelkmy)
Dim AFH As Integer
AFH=3
Do While AFH <3+3
AFH=AFH+2: DoEvents
Loop
Dim SkQD As Currency
Dim PFGLM As Integer
PFGLM=4
Do While PFGLM <4+4
PFGLM=PFGLM+3: DoEvents
Loop
Set ICREJdtoccujwnuvg=CreateObject(YQFBJyluelkmy)
Dim WbU1Ïq As Integer
WbU1Ïq=1
Do While WbU1Ïq<1+4
WbU1Ïq=WbU1Ïq+1: DoEvents
Loop Logic obfuscation refers to using long code sequences or comments to obscure discovery of one or two lines of code with malicious operations. Features that can be generated to characterize logic obfuscation include length of VBA code except comments and length or size of comments in VBA code. While MS Office files can be encrypted, requiring a password to be decrypted and opened, VBA macros are not encrypted with the rest of the document. Therefore, malicious macros cannot be obscured by encryption. A VBA project can be protected with a password. However, MS Office has enforced this as a logical protection. The VBA code is not encrypted in the file, and so can be extracted in clear text using tools such as OLETOOLS.

System Overview

Figure 1:
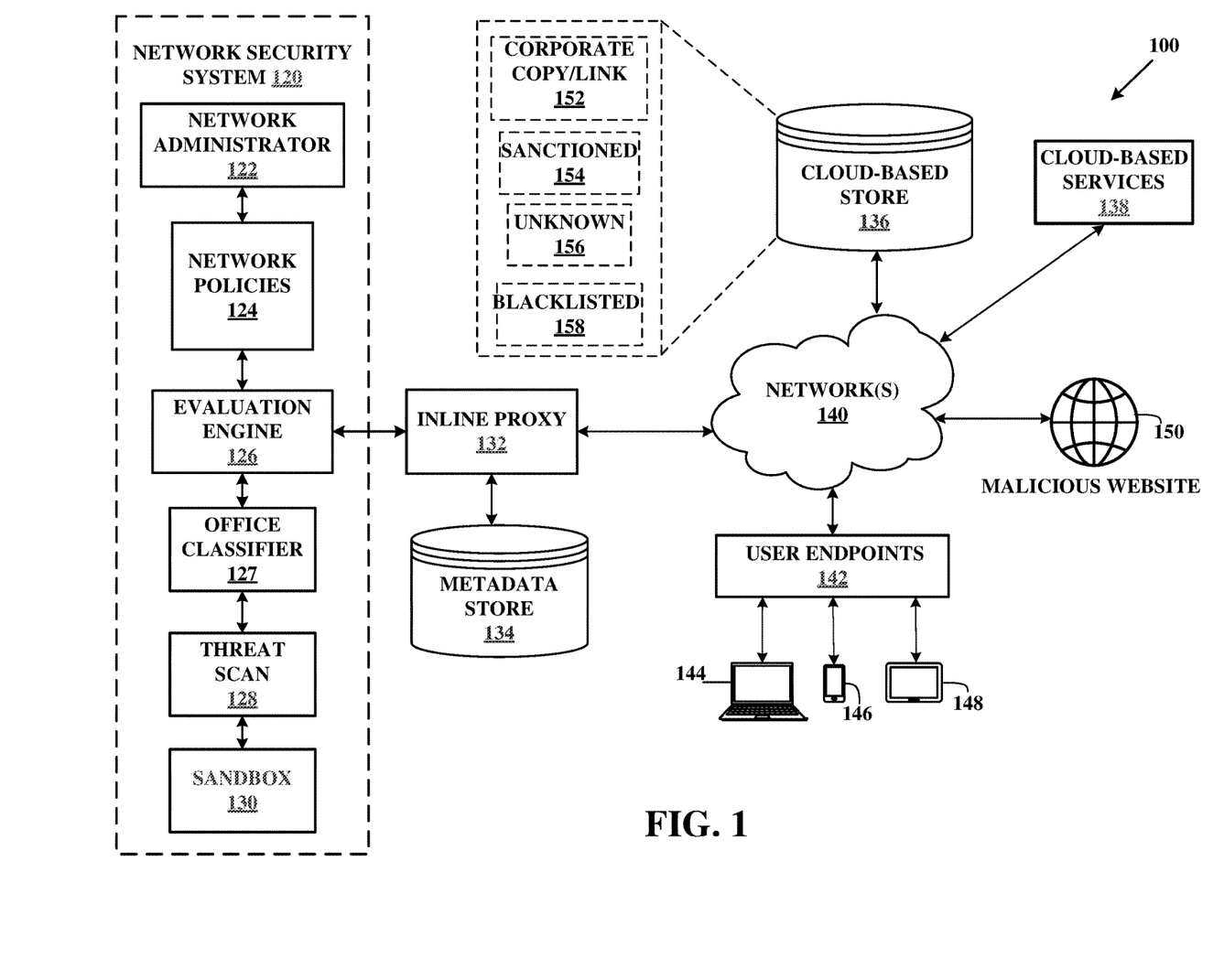
FIG. 1 illustrates an architectural level schematic of a system for detecting malicious content in MS Office macros and MS Office embedded OLE object files. The disclosed system uses machine learning and feature engineering to develop a supervised training model to detect malicious content in signatureless malicious data.

The following describes in architectural form a system and various implementations for preventing macro and OLE object malware attacks in a cloud-based system including an off-site cloud-based store. An architectural diagram of the system 100 is shown in FIG. 1, which is intentionally simplified to improve clarity in the description. FIG. 1 shows the interconnection of the various major elements. The use of these elements will be described in greater detail further on in connection with the discussion of the structure and use of those elements.

FIG. 1 includes the system 100 including the endpoints 142. User endpoints 142 may include devices such as computers 144, smart phones 146, and computer tablets 148, which provide access and interact with data stored on a cloud-based store 136 and cloud-based services 138. An inline proxy 132 is interposed between the user endpoints 142 and the cloud-based services 138 through the network 140 and particularly through a network security system including a network administrator 122, network policies 124, an evaluation engine 126, an office classifier 127, a threat scan subsystem 128, a sandbox 130, and a metadata store 134, which will be described in more detail. The In-line proxy 132 may be accessible through the network 140, or it may be resident as part of the network security system 120. The in-line proxy 132 provides traffic monitoring and control between the user endpoints 142, the cloud-based store 136 and other cloud-based services 138.

The in-line proxy 132 monitors the network traffic between user endpoints 142 and cloud-based services 138, particularly to enforce network security policies including data loss prevention (DLP) policies and protocols.

The interconnection of the elements of system 100 will now be described. The network 140 couples the computers 144, smart phones 146, and the computer tablets 148 and metadata store 134 and in the in-line proxy 132 with each other. The communication path can be point-to-point over public and/or private networks. The communication can occur over a variety of networks, including private networks, VPN, MPLS circuit, or Internet, and can use appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

Communications may be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX.

The engines or system components of FIG. 1 are implemented by software running on varying types of computing devices. For example, a workstation, server, a computer cluster, a blade server, or a server farm. Additionally, a variety of authorization and authentication techniques, such as username/password, Open Authorization (OAuth), Kerberos, SecureID, digital certificates and more, can be used to secure the communications.

The cloud-based services 138 provide functionality to users that is implemented in the cloud or on the Internet. The cloud-based services 138 can include Internet hosted services such as news web sites, blogs, video streaming web sites, social media web sites, hosted services, cloud applications, cloud stores, cloud collaboration and messaging platforms, and/or cloud customer relationship management (CRM) platforms. Cloud-based services 138 can be accessed using a browser (via a URL) or a native application (a sync client).

Categories of cloud-based services 138 include software-as-a-service (SaaS) offerings, platform-as-a-service (PaaS) offerings, and infrastructure-as-a-service (IaaS) offerings. Examples of common web services today include YouTube™, Facebook™, Twitter™, Google™, LinkedIn™, Wikipedia™, Yahoo™, Baidu™, Amazon™, MSN™, Pinterest™ Taobao™, Instagram™, Tumblr™, eBay™, Hotmail™, Reddit™ IMDb™, Netflix™, PayPal™ Imgur™ Snapchat™, Yammer™, Skype™, Slack™, HipChat™, Confluence™ TeamDrive™, Taskworld™, Chatter™, Zoho™, ProsperWorks™, Google's Gmail™ Salesforce.com™, Box™, Dropbox™, Google Apps™, Amazon AWS™, Microsoft Office 365™, Workday™, Oracle on Demand™, Taleo™, Jive™, and Concur™.

Users belonging to a corporate organization access hundreds of providers of cloud-based services to generate, store, collaborate, and share data with other users inside or outside of the organization. This can invite malware attacks. The cloud-based services 138 provide functionality to the users of the organization that is implementing security policies. When a user sends a request to a cloud-based service via an endpoint 142, the inline proxy 132 intercepts the request message. The inline proxy 132, by accessing a database, seeks to identify the cloud-based service 138 being accessed. In one implementation, according to the present invention, The inline proxy accumulates the metadata in request messages from the user to the metadata store 134 to identify cloud based services 138 being accessed. When a document instance is shared or linked between a cloud-based store 136 and user endpoints 142 through the network, there is a danger of malware attacks.

Office Classifier

Figure 2:
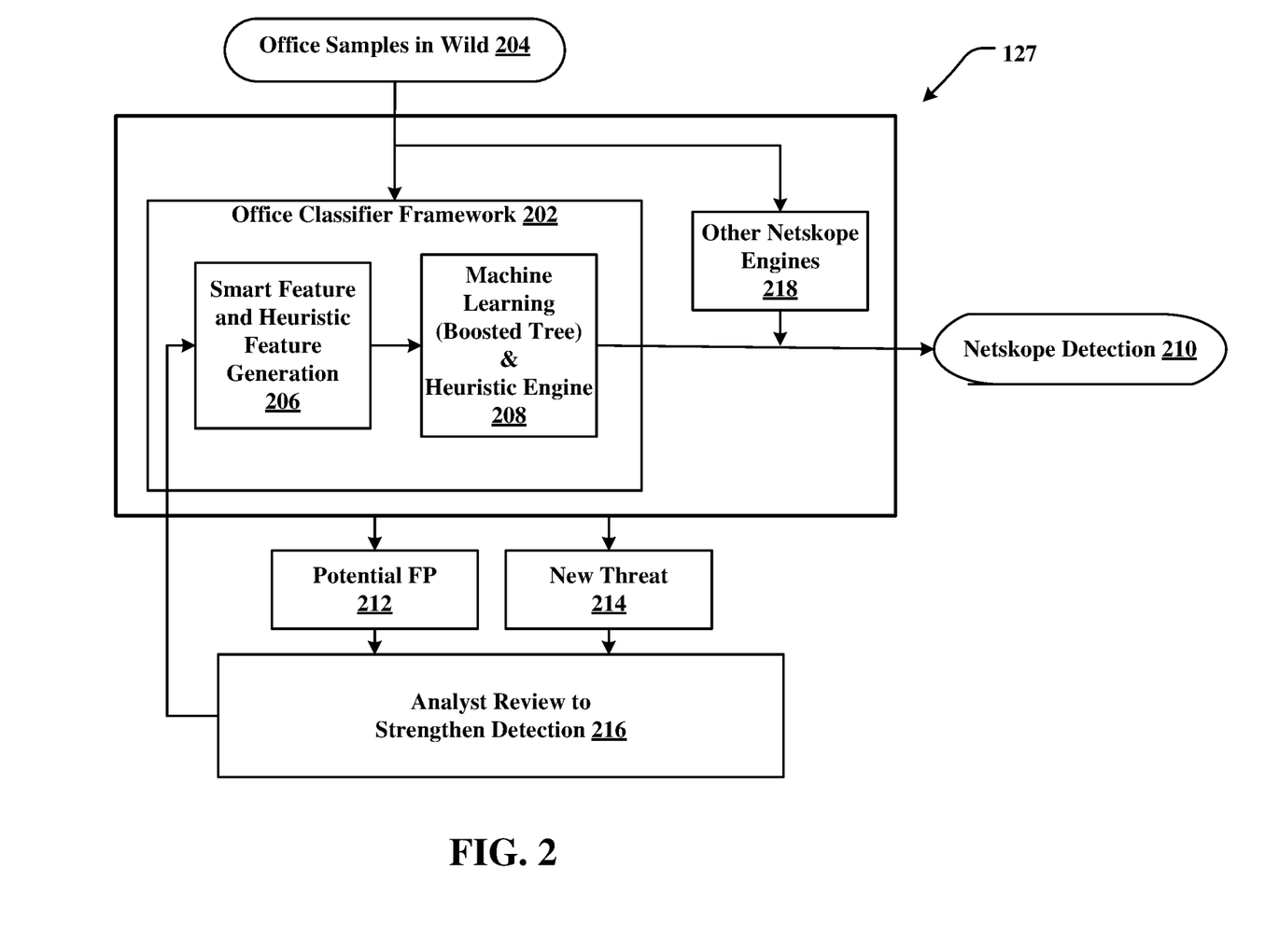
FIG. 2 illustrates malware detection aspects of an office classifier for detecting malware included in macros in MS Office documents and OLE objects operating within a Netskope network security system particularly showing the placement of ML based office classifier inside the network security system.

The office classifier 127 is shown in more detail in FIG. 2. The office classifier framework 202 receives office documents in the wild 204, which may or may not include malicious code. The term "in the wild" 204 generally referred to malicious programs already circulating in the public, doing various kinds of damage. The office classifier 127 is an integral part of the network security system 120 shown in FIG. 1 and operates in cooperation with other elements of the network security system 120.

The office classifier framework 202 uses supervised training of a machine learning model 208 to predict malicious content in document files. The machine learning model is trained using labeled training data and a machine learning algorithm, which will be described in connection with FIG. 3. The features used for training the machine learning model are discussed further on. The determination of these features is based on an analysis of methods used by malware authors to embed malicious macros and malicious OLE object using obfuscation and other known techniques to create difficulty in locating malicious content.

In one aspect, the office classifier 127 can use a heuristic feature generator 206 to generate a list of features derived from properties and attributes of malicious macros and malicious OLE Objects, which can be used to train an advanced boosted-tree based machine learning algorithm 208. The office classifier 127 can then classify the new Office documents as to threat level, based on those features. In another aspect, the heuristic feature generator 206 can correlate the features of malicious macros and malicious OLE objects with a set of keywords, defining the unique a set of features extracted out of Office documents, providing a variance to a machine algorithm, resulting in a very accurate detection result.

The office classifier 127 uses the features extracted out of following embedded artifacts from MS Office Documents. These features are used to train Machine Learning (ML) model 208.

1) MACRO (VBA Code)
2) DDE
3) Embedded OLE Objects

Unlike most traditional ML and heuristic-based solutions, the Office Classifier 127 does not solely depend on static features like:

1) API in VBA code.
2) URL the macro connects.
3) Auto execution.
4) Embedded PE/Document files.

Instead, the office classifier 127 collects those features that help to detect amount of obfuscation the macro code uses along with other artifacts such as metadata (document size, pages, paragraphs, etc.), code entropy etc. Through analysis of many instances of obfuscated macro code, it has been observed that obfuscation types used by malware authors can be categorized as 1) Logical; 2) Encoding; 3) Split; and 4) Random Obfuscation, as previously described.

As stated, malware authors often use these obfuscation types to inflate the time of analysis, which in turn delays the countermeasures after detection. Although each obfuscation method is quite simple, when used in combination, they render the code visually indecipherable. In addition, malware authors use obfuscation tools to create many variants of malware with different hash values.

Malware authors seem to use such obfuscation technique in many of their malware campaigns, including the recent one from EMOTET. As explained above, the obfuscation is primarily achieved using VBA language features such as string operators, functions, etc. The office classifier 127 collects such unique indicators from the VBA code in successful classification through Machine Learning and a Heuristic engine.

The disclosed technology targets detecting both OLE2 and OXML type documents of MS Office covering Word, Excel and PPT. Feature extraction activity is basically extraction and parsing of required items like VBA code, DDE and Embedded items from the Office Documents. No single features an absolute marker. Rather, the group of extracted features contributes to the classification.

Continuing with FIG. 2, potential false positives 212 and new threats 214 may require an analyst review 216 for to improve the level of malware detection, which may require some adjustments within the office classifier framework 202. In addition, other threat detection engines 218 may operate in tandem with the machine learning and heuristic engine 208 to improve overall performance of the malware detection, leading to the significantly improved final detection result 210.

Machine Learning and Feature Engineering

Figure 3:
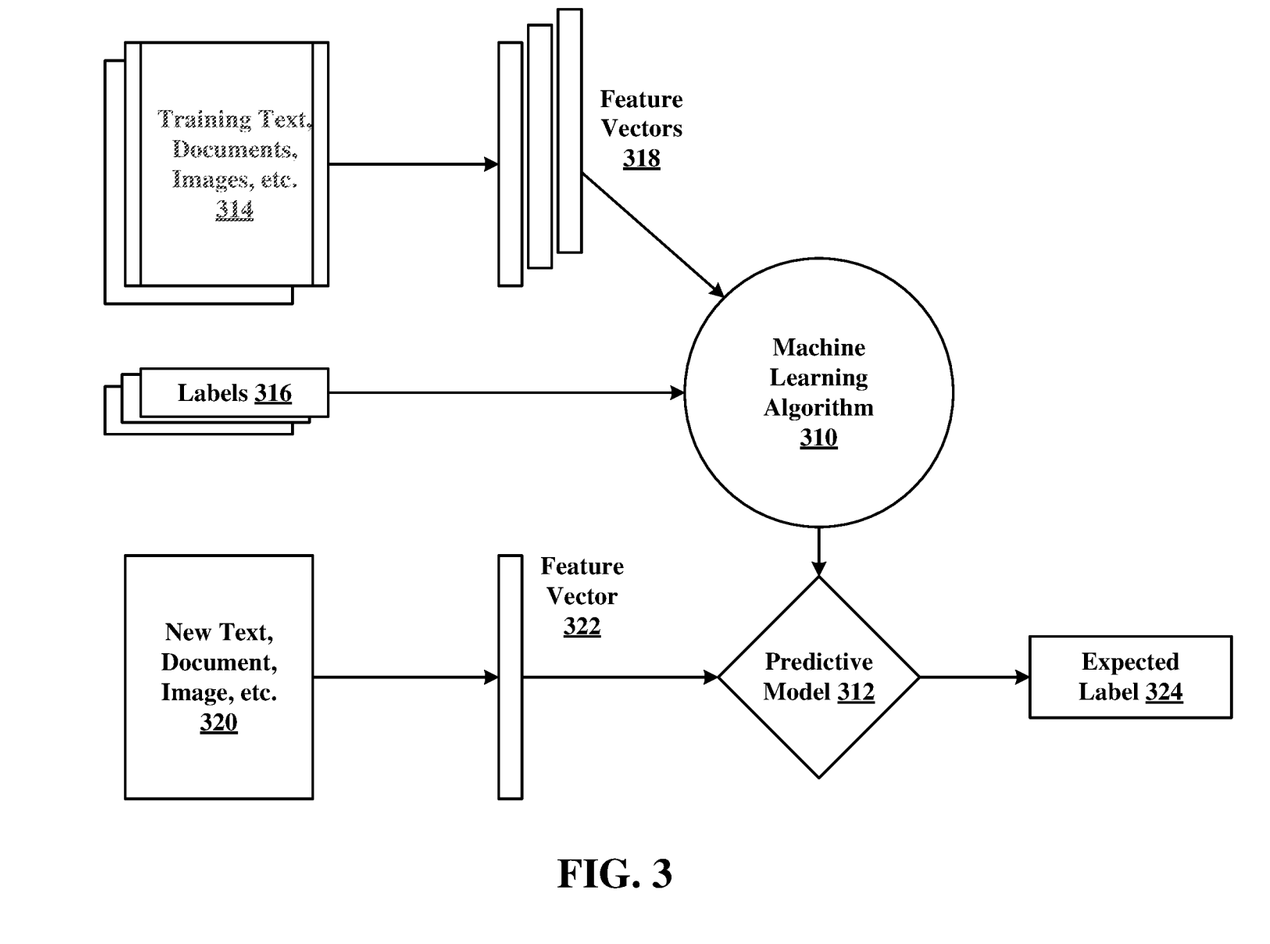
FIG. 3 illustrates an example workflow for training a supervised machine learning model according to an aspect of the present technology.

The technology disclosed for machine learning and feature engineering, is shown in more detail in FIG. 3.

Document files may include multiple macros and embedded files. For the purpose of feature extraction, all macros are considered and combined as one single entity. Extracting macro code and embedded file info from a document (all formats), including both CFBF (Compound file Binary Format) and OpenXML. Features from macros and embedded OLE objects are extracted for processing by a machine learning algorithm that detects malicious code in Microsoft Office documents. The list of features associated with the construction of feature vectors is described further on.

FIG. 3 illustrates the training of a supervised machine learning model 312. The training uses a suitable machine learning algorithm 310 such as Random Forest, Decision Tree, Linear Regression or the like. Alternatively, the machine learning algorithm could use a convolutional neural network, a CNN, including a deep learning structure such as Inception. In supervised machine learning, training data includes classification labels 316. Training text, documents, images 314 are used to extract features. Ideally this sampling should be large, on the order of a million samples, to be extracted and kept in a .csv file for further machine learning (ML) processing by a data scientist.

The sample collection should avoid duplicates and must be leveled. The sample collection ideally contains a combination of labeled malicious files and clean document files, including documents which have shown to be false positives (FP) inside a network security environment, such as Netskope.

When the feature vectors 318 are identified and labeled, they are combined by the machine learning algorithm 310 to create the predictive model 312.

New unlabeled data in the form of new text, documents, images, etc. 320 are classified through the selected feature vector 322 and input into the predictive model 312. The predictive model processes 312 the new data 320 and provides the expected label 324 as an end result.

Figure 4:
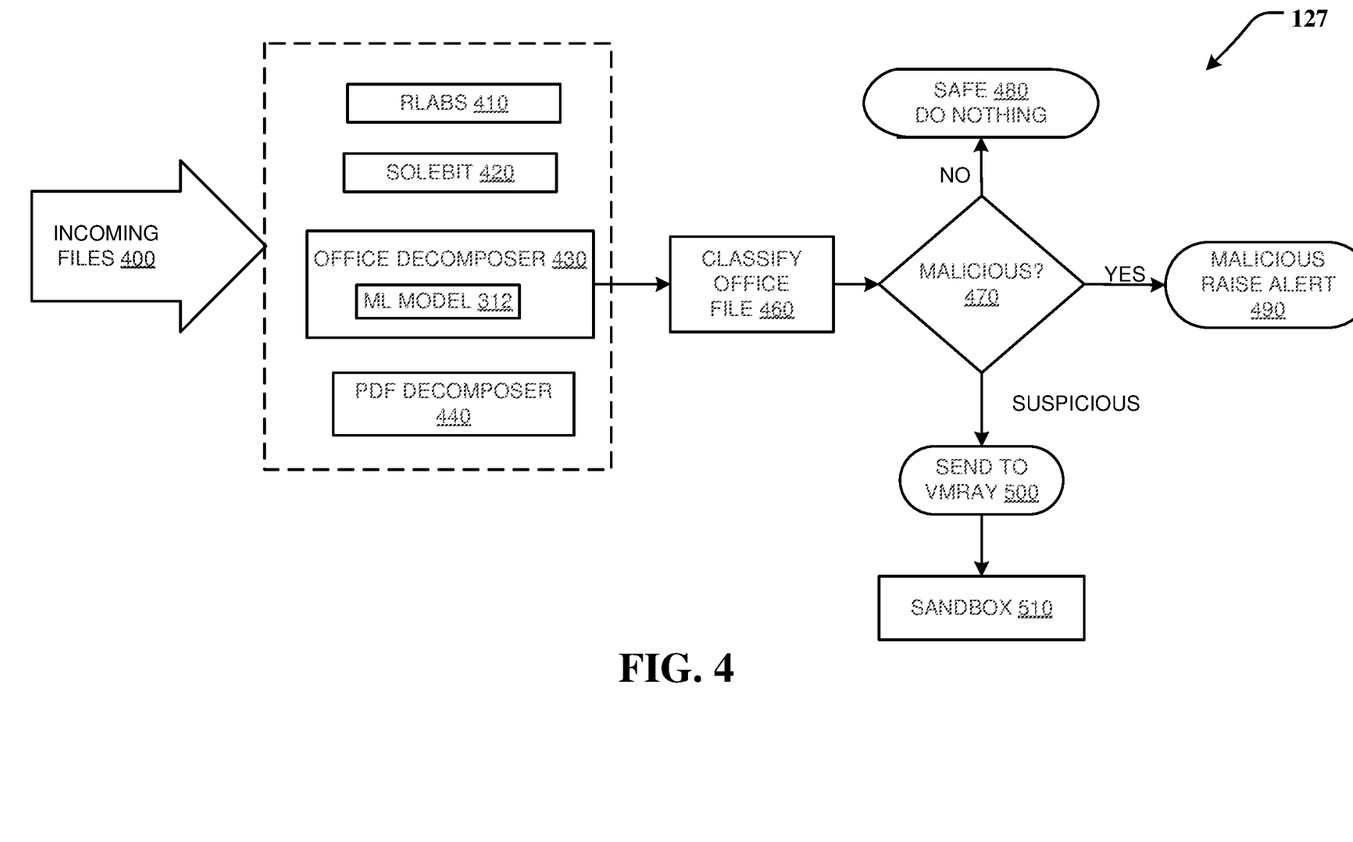
FIG. 4 is a flow diagram of the office classifier, illustrating how potentially malicious files are classified and post-processed.

Turning now to FIG. 4, a flow diagram of the office classifier 127 is shown, illustrating how potentially malicious files are processed and classified according to the disclosed technology.

The office classifier 127 receives an incoming document 400 over a network, parses that document, extracting features, and applies the machine learning algorithm to classify the document as to threat level, as safe 480, suspicious 500, or malicious 490. Safe documents 480 are allowed into the network. Suspicious documents 500 are subjected to additional processing, including quarantining or sandboxing methods 510. Malicious documents 490 raise an alert and are ultimately rejected or blacklisted from the network. Detected malicious files 490, may be quarantined for further study analysis. In one aspect, the document may undergo in-depth threat scanning by the security administrator, which may also include isolation in the sandbox 130, where any executable embedded code is run in an isolated environment to determine if any embedded links cause malicious activity.

In a further aspect, the disclosed technology combines machine learning with other network security methods, 410, 420 to further increase the capability of a network security system to detect malicious macros and malicious OLE documents.

Feature Engineering Using Instances of Prior Detected Malware

In one aspect, the technology disclosed uses a machine learning algorithm. A list of features can be derived from prior malware attacks, with or without heuristics to assist in derivation. The features are used for training the machine learning algorithm.

In another aspect, the technology disclosed also detects malicious embedded OLE objects inside Office Documents. These extracted features from leveled samples are used to train a supervised model using a boosted-tree algorithm. Features combined from different categories provide a very good variance to a machine learning algorithm. Heuristics can be used to help derive a set of feature vectors for training the machine learning algorithm.

A combination of these two approaches—machine learning for zero-day and repeated malicious patterns and heuristics for detection of recognized malicious patterns—provide superior results in detecting malicious document files in the form of embedded macros and OLE objects. The technology disclosed uses feature engineering from the heuristic engine to train a machine learning algorithm.

Figure 5:
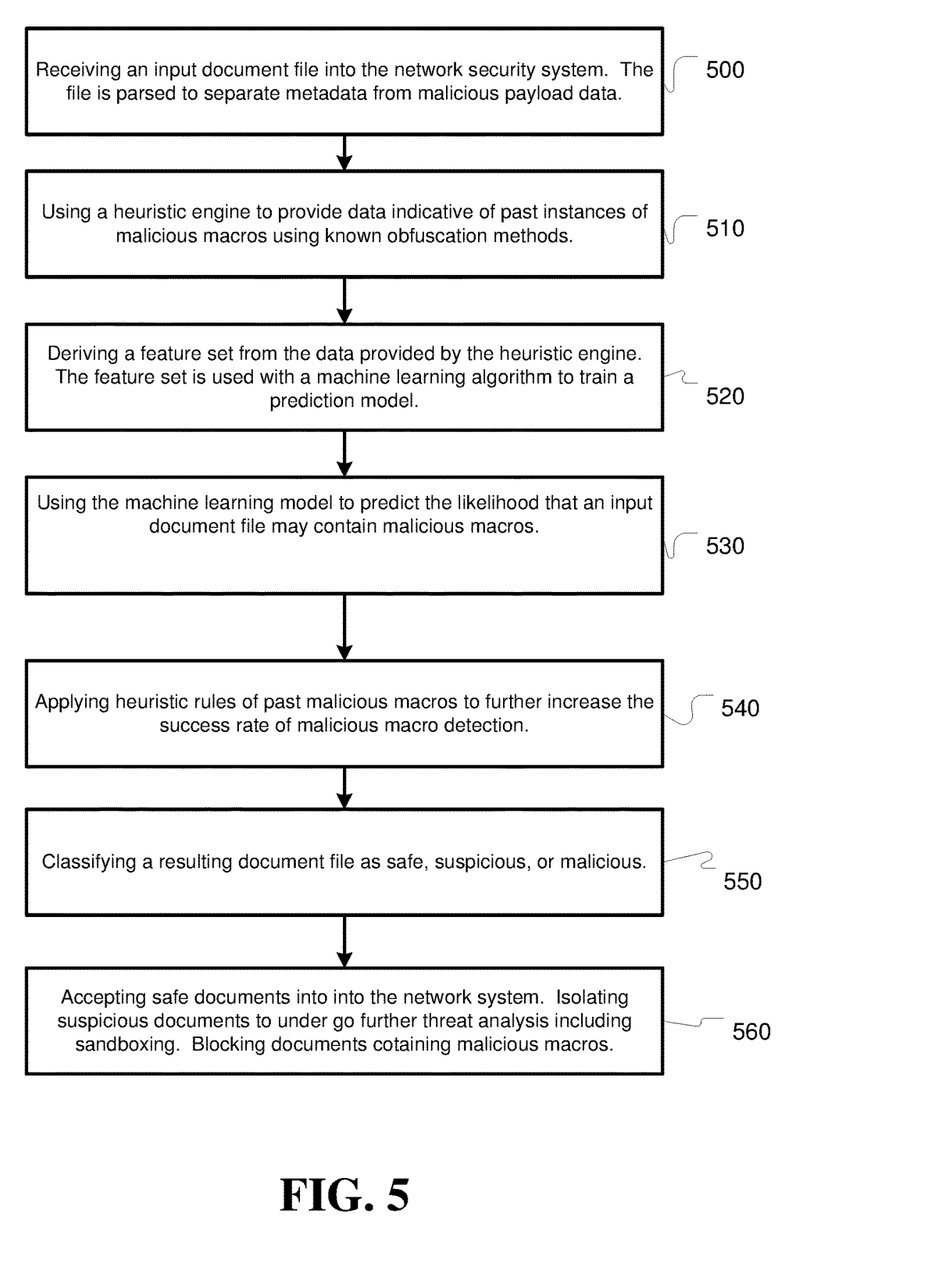
FIG. 5 is a flowchart illustrating the steps in detecting embedded macros.

FIG. 5 is a flowchart illustrating the steps in detecting malicious embedded macros. In step 500, a document file is received into a network security system. The document file is parsed to separate metadata from malicious payload data. In step 510, a heuristic engine within the office classifier 127 uses data indicative of past instances of malware embedded in macros using known obfuscation methods. In step 520, a feature set can be derived from the data provided by heuristics. The feature set is used, in part, for training a machine learning algorithm model using machine learning methods to predict the likelihood that a document file includes a malicious macro code. In step 530, the trained machine learning model is used to predict the likelihood that an input document may contain a malicious macro. In step 540, heuristic rules derived from instances of malicious macros are applied to increase the success rate of detecting malicious macros in the document file. In step 550, the office classifier 127 classifies a resulting document file as safe, suspicious, or malicious. In step 560, safe documents are accepted into the network system, malicious documents are blocked, and suspicious documents are isolated for further threat analysis including sandboxing.

Figure 6:
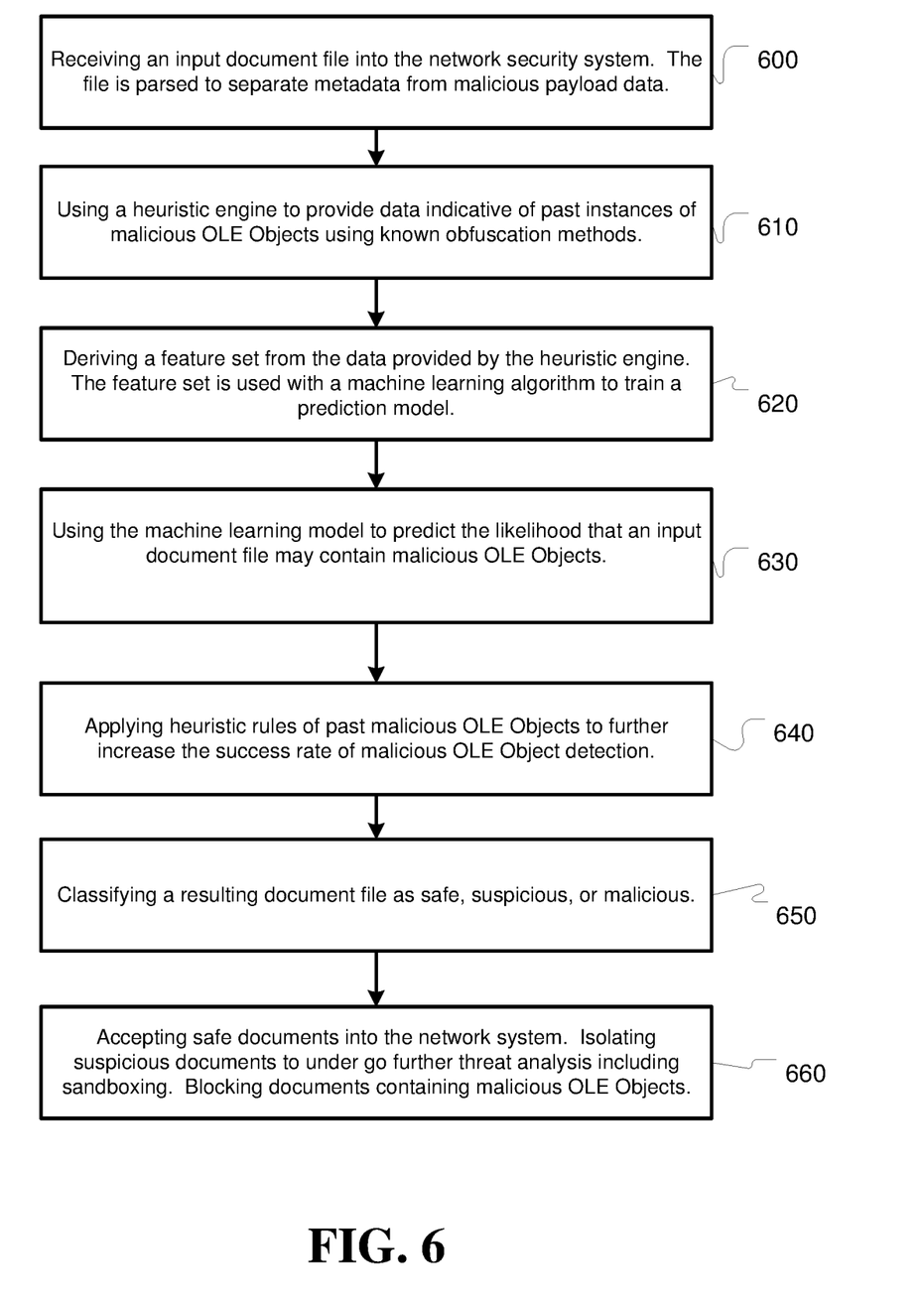
FIG. 6 is a flowchart illustrating the steps in detecting embedded malicious OLE object files.

FIG. 6 is a flowchart illustrating the steps in detecting malicious embedded OLE Objects. In step 600 a document file is received into a network security system. The document file is parsed to separate metadata from malicious payload data. In step 610, a heuristic engine within the office classifier 127 uses data indicative of past instances of malicious embedded OLE Objects using known obfuscation methods. In step 620, a feature set can be derived from the data provided by heuristics. The data is used, in part, for training a machine learning algorithm model using machine learning methods to predict the likelihood that a document file includes a malicious embedded OLE Object code. In step 630, the trained machine learning model is used to predict the likelihood that an input document may contain a malicious embedded OLE Object. In step 640, heuristic rules derived from instances of malicious embedded OLE Objects are applied to increase the success rate of detecting malicious embedded OLE Objects in the document file. In step 650, the office classifier 127 classifies a resulting document file as safe, suspicious, or malicious. In step 560, safe documents are accepted into the network system, malicious documents are blocked, and suspicious documents are isolated for further threat analysis including sandboxing.

Broad Categories of Features Extracted from MS Office Documents

MACRO
1) Feature indicating count of use of VBA and Windows API, like CreateObject, Shell, FileSystem, URLDownloadToFile, CallByName, Detect Sandbox, Virtualization and Anti-Debugging etc. Collecting the count gives a variance for both ML and Heuristic approach when is compared with features against clean documents.
2) Feature indicating the count of auto executions (On Document open/close, click events on VBA controls) in VBA macro.
3) Feature Indicating the count of String Operations using VBA string operators (concatenation) like +, &, and =.
4) Features indicating the counts of Text, Type Conversion, Arithmetic and financial functions using VBA functions such as Asc( ), Chr( ), ChrW etc. CBool( ), CStr( ), CLng( ) etc, Abs( ), Atn( ), RND( ) etc, DDB( ), FV( ) IPmt( ) in VBA macro.
5) Feature indicating OLE stream profile such no of OLE stream, passcode enabled etc.
6) Feature indicating VBA code profile like count of code line, comment, variables, functions, loop, event, hex string, entropy, etc.

STATIC: Comprising a Document's Static Properties.
1) Documents size, type of document (Word/Excel/PPT), Creation/Modification time and Revision numbers.
2) Number of pages, paragraph, lines, characters
3) Document is template, VBA code presence in document metadata DDE: Comprising features from Dynamic Data Execution Code/Strings if available.
1) If DDE is auto executable.
2) If DDE has usage of trusted windows utilities like cmd.exe, powershell, wmi, wscript, and cscript utility.
3) If DDE has URL, Hyperlink to access.
4) If DDE has usage of executable, file download, registry script, Addin and Macro-button.

Embedded: Comprising Features from Embedded Objects Inside Office Documents
1) Embed objects having suspicious files like exe, dl1, 7z, dmg, deb, rar, etc.
2) Embed objects having semi-suspicious files like sql, cer, cfm, etc.
3) Embed objects having other files like no extn.
4) Embed objects having external hyperlink to a URL.

Test Results

Using a test corpus of randomly selected set of 2000 malicious MS Office samples with macros from VirusTotal and 2000 clean samples from VirusTotal shows that the disclosed technology can detect 87.4% of the malware samples with no false positives; when combined with other malware detection engines, such as those provided by Netskope, Inc., an accuracy of 98.9% accuracy has been achieved with no false positives. This architecture provides proactive, generic detection for malware samples that use similar obfuscation and other tactics used in previously analyzed samples.

VBA-Derived Macro Features:

MACRO_IS_PRESENT—This feature indicates whether a macro is present in the document being scanned. This can either be a count or a Boolean.

MACRO_AUTOEXEC—This feature indicates whether a macro is automatically executed upon opening of the document being scanned. This can be a Boolean. Functions similar to AutoExec, that trigger macros based on events or states of operation, include Document_Open and Document_Close. This group of functions can be collectively counted. A single instance of event triggered macro execution can be suggestive of malicious coding. Multiple instances of event triggered macro execution can be suggestive of legitimate code. ML is good at making such distinctions, for this feature and others.

MACRO_EXECUTE—This feature indicates whether the macro launches code, including external code. This can either be a count or a Boolean.

MACRO_EXECUTE_POWERSHELL—This feature indicates whether the macro causes launching of windows PowerShell, which executes scripts. This can either be a count or a Boolean.

MACRO_WRITE—This feature indicates whether the macro sends data to the disk of the same computer or to a network location. Many programs legitimately write log files using this function. One consideration that can go into this feature is whether the file written is a binary file or a textual log file.

MACRO_HAS_INTERNETDOWNLOAD—A download is more significant as a feature than simply connecting to the Internet.

MACRO_HAS_REGISTRY_ACCESS—Writing or editing the registry can be indicative of malicious intent.

MACRO_COMMENT_LINES—It has been observed that malicious code has fewer commented lines than VBA code that needs to be maintained.

MACRO_CODE_LINES—There are a typical numbers of lines in malicious macro families.

MACRO_HAS_HEX_STR—Use of Hex encoding is unusual in legitimate VBA macro code. Several synthetic features are constructed from other extracted features. Three examples are given here, which are based on engineering judgment.

MACRO_RULE1 #MACRO_RULE1—
MACRO_AUTOEXEC=true and MACRO_WRITE=true and
MACRO_HAS_HEX_STR=false
MACRO_RULE2 #MACRO_RULE2—
MACRO_AUTOEXEC=true and MACRO_WRITE=true and MACRO_HAS_HEX_STR=true
MACRO_RULE3 #MACRO_RULE3—
MACRO_AUTOEXEC=true and MACRO_WRITE=true and
MACRO_HAS_HEX_STR=false MACRO_OLESTREAM_COUNT—Malicious macros have very few OLE streams. In contrast, numerous OLE streams often appear in legitimate documents that are repeatedly updated.

MACRO_OLE_PASSCODE—# is OLE/VBA passcoded project stream Project Protection State.

MACRO_DETECT_SANDBOX—This feature indicates whether the macro attempts to detect that a sandbox is running, such as detecting Anubis, Sandboxie, Norman, CW, Winjail or any other type of sandbox. Non-malicious applications have no reason to detect whether they're running in a sandbox. Marcos are thoroughly parsed and therefore do not need to run in a sandbox.

MACRO_DETECT_VIRTUALIZATION—Detecting virtualization or debug mode is also more common. Virtualization is a more general feature than looking for a specific sandbox.

MACRO_RUN_SHELLCODEINMEMORY—VBA macros can run a shellcode in memory. At present, this is not widely exploited, but it could be exploited.

MACRO_DISABLE_SECURITY—There is very little reason for legitimate code to disable VBA macro security or disable protected view. This is strongly suggestive of maliciousness.

The following series of features relate to the obfuscation discussion above.

MACRO_SELF_MODIFICATION—as above described, macro may attempt to modify the VBA code (self-modification), including constructing parameters of code executable in the language other than VBA. Split and encoding obfuscation are prominent means of self-modification.

MACRO_NUM_STRINGOPS—The count of using string operators such as '+', '=' or '&' can be indicative of split obfuscation. Encoding obfuscation features can include multiple counts of various function types.

MACRO_NUM_TEXTFUNC is a count of text functions including: Asc( ), Chr( ), Mid( ), Join( ), InStr( ), Replace( ), Right( ), StrConv( ), etc.

MACRO_NUM_ARITHFUNC is a count of arithmetic functions including: Abs( ), Atn( ), Cos( ), Exp( ), Log( ), Randomize( ), Round( ), Tan( ), Sqr( ), etc.

MACRO_NUM_TYPECONVFUNC is a count of type conversion functions, including: CBool( ), CByte( ), CChar( ), CStr( ), CDec( ), CUInt( ), CShort( ), etc.

MACRO_NUM_FINCFUNC is a count of financial functions, including: DDB( ), FV( ), IPmt( ), PV( ), Pmt( ), Rate( ), SLN( ), SYD( ), etc.

Logical Obfuscation features overlap with random obfuscation features, both of which can be addressed by an entropy measure.

MACRO_SHANNON_ENTROPY is a Shannon Entropy score for the VBA macro code.

Embedded Files And Features:
OLE Streams
MS Office doc files will be scanned for any embedded files in it. The following OLE streams (x01Ole10Native, \x01CompObj and ObjectPool) will be decoded to collect the embedded file information. Following would be the features extracted from Embedded files:
  EMBED_NONE
  EMBED_HAS_CORRUPT
  EMBED_HAS_PASSWORD_PROTECTED
  EMBED_HAS_SUSPICIOUS_BIN—The file is from any of the files/extn listed in suspicious bins.
  EMBED_HAS_SEMI_SUSPICIOUS_FILE—The file is from any of the files/extn listed in semi_suspicious_ files
  EMBED_HAS_NORMAL_FILE—The file is from any of the files/extn listed in normal_files
  EMBED_HAS_OTHER_FILE—The file is not from any of the above category and not compressed_files.
  EMBED_HAS_COMPRESSED_FILE—The file is from any of the files/extn listed in compressed_files.
  EMBED_HAS_NON_EXT
  EMBED_RULE1—This is EMBED_RULE1.
  EMBED_HAS_SUSPICIOUS_BIN=true, OR
  EMBED_HAS_OTHER_FILE=true
  Heuristic Rule:
If a MS Office file contains an embedded file in category (A) suspicious bins or category (E) unknown extensions, then it is likely malware.
  Sets:
  Suspicious bins (A)="7z", "apk", "app", "asp", "aspx", "bat", "bin", "cab", "cgi", "com", "cpl", "crx", "deb", "dll", "dmg", "dmp", "dry", "exe", "gadget", "jar", "j s", "j se", "j sp", "ink", "msi", "php", "pkg", "pl", "plugin", "py", "rar", "rpm", "sh", "sys", "torrent", "vbs", "wsf", "zip", "zipx"

Semi suspicious (B)="cer", "cfm", "csr", "deb", "dcr", "db", "dbf", "docm", "mdb", "pdb", "sql", "swf", "xlsm"

Normal (C)="3ds", "3dm", "ai", "aif", "bmp", "css", "csv", "doc", "docx", "dwg", "dxf", "eps", "flv", "fnt", "fon", "gif", "htm", "html", "indd", "jpg", "key", "log", "m3u", "m4a", "max", "mid", "mov", "mp3", "mp4", "mpg", "obj", "otf", "pages", "pct", "pdf", "png", "ppt", "pptx", "ps", "psd", "pspimage", "rm", "rtf", "svg", "tex", "tga", "thm", "tif", "tiff", "ttf", "txt", "vob", "wav", "wma", "wmv", "wpd", "wps", "yuv", "xlr", "xls", "xlsx"

No extension (D)=filename does not contain "."

Compressed file (F)="7z", "cbr", "gz", "rar", "sitx", "tar", "zip", "zipx"

Unknown extensions (E)=file name not in set A, B, C, D, or F. This means it has an extension, but it is not one defined in the other sets.

Static Attributes and Features:

Following are the static attributes that will be extracted as part of feature extraction from MS Office Document files. Machine Learning (ML) models will be trained with these features to boost the ability to detect malicious documents.

DOC_NUM_PAGES
DOC_NUM_WORDS
DOC_NUM_LINES
DOC_NUM_CHARS
DOC_NUM_PARAGRAPH
DOC_LASTMOD_TIME
DOC_AUTHOR_INFO
DOC_REVISION_NUMBER
DOC_LASTPRINT_TIME
DOC_LINK-IS_DIRTY
DOC_LANGUAGE
DOC_SIZE

Comparison to Other Detection Methods

Hash-Based detection: The disclosed technology is more generic and proactive, Hash-Based detection covers only one sample.

Antivirus Signatures: The disclosed technology is more generic and proactive. This is not a simple/string pattern match.

Fuzzy Hash: The disclosed technology is much more generic. Fuzzy Hash is also just a fuzzy byte/string pattern match.

Pure Machine Learning model: The disclosed technology, using a hybrid model can respond to new attacks faster while achieving lower false-positive (FP) rate.

Sandbox-based detection: The disclosed technology is uses static detection, and it is much less expansive. Also, we would be able to achieve a much lower false-positive (FP) rate.

Computer System

Figure 7:
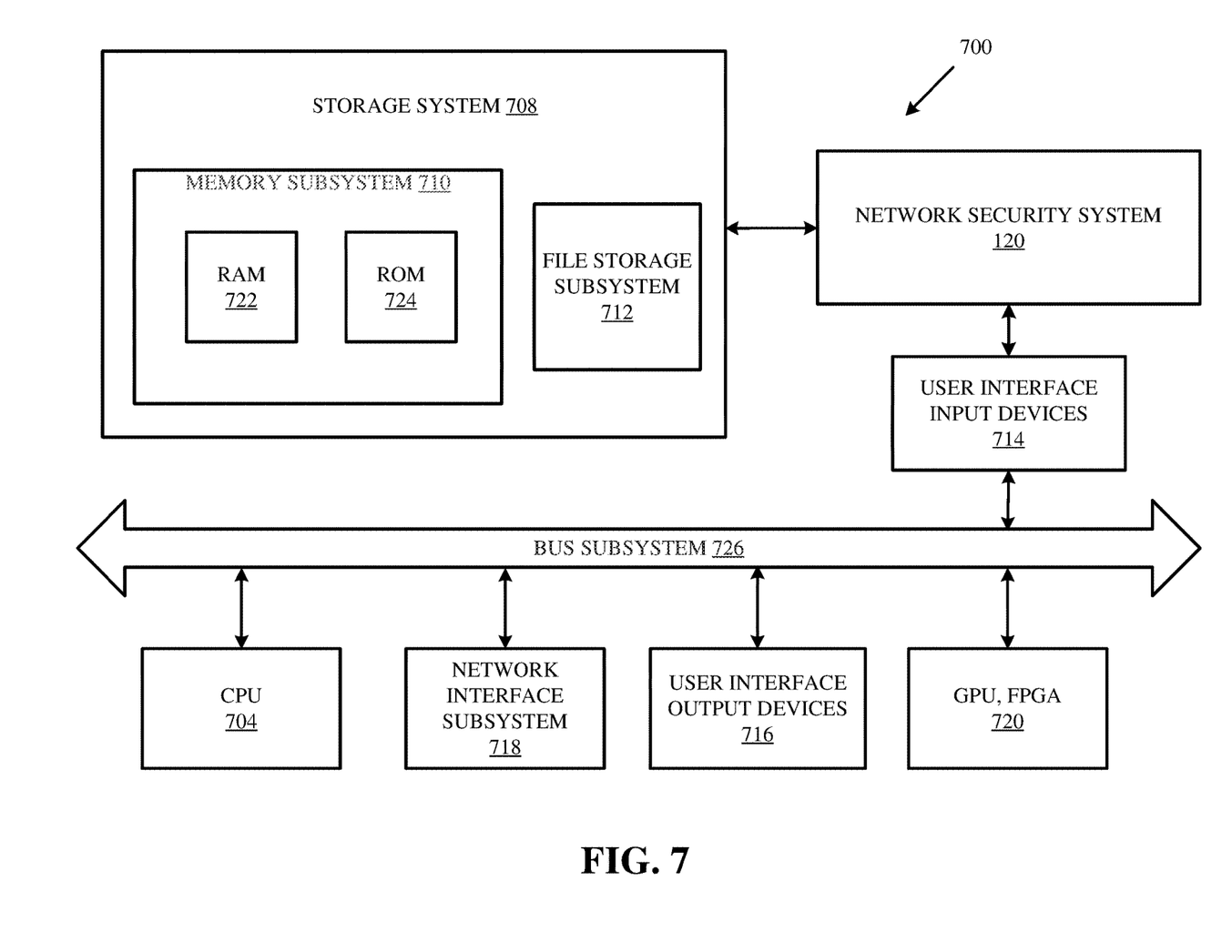
FIG. 7 is a simplified block diagram of a computer system that can be used to detect malicious macros embedded in MS Office documents and MS Office documents having embedded OLE content.

Turning now to FIG. 7, a simplified block diagram of a computer system 700 is shown that can be used for providing network security in a cloud-based network for delivering cloud-based services. Computer system 700 includes at least one central processing unit (CPU) 704 that communicates with a number of peripheral devices via bus subsystem 726, and network security system 120 for providing network security services described herein. These peripheral devices can include a storage subsystem 708 including, for example, memory devices 722, 724 and a file storage subsystem 712, user interface input devices 714, user interface output devices 716, and a network interface subsystem 718. The input and output devices allow user interaction with computer system 700. Network interface subsystem 718 provides an interface to outside networks, including an interface to corresponding interface devices in other computer systems. In one implementation, network security system 120 of FIG. 1 is communicably linked to the storage subsystem 708 and the user interface input devices 714. User interface input devices 714 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 716 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 708 stores programming and data constructs that provide the functionality of some or all of the modules and methods described herein. Additional subsystems 720 can be graphics processing units (GPUs) or field-programmable gate arrays (FPGAs).

Memory subsystem 710 used in the storage subsystem 708 can include a number of memories including a main random access memory (RAM) 722 for storage of instructions and data during program execution and a read only memory (ROM) 724 in which fixed instructions are stored. The file storage subsystem 712 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 712 in the storage subsystem 708, or in other machines accessible by the processor 704.

Bus subsystem 726 provides a mechanism for letting the various components and subsystems of computer system 700 communicate with each other as intended. Although bus subsystem 726 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present invention. Many other configurations of computer system 700 are possible having more components or less components than the computer system 700 depicted in FIG. 7.

Particular Implementations

The technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections. These recitations are hereby incorporated forward by reference into each of the following implementations.

The technology disclosed relates to cybersecurity attacks and cloud-based security. The technology disclosed is a method and apparatus for detecting documents with embedded threats in the form of malicious macros and malicious OLE objects.

In one aspect the technology disclosed is a method for classifying input documents in a networked system to determine if at least one of said documents may include a macro having malicious code. The method includes repeatedly receiving a document file into a network security system. Each document file parsed to separate the macro data from the document payload data. The method next generates for the document file at least obfuscation scoring features indicative of past instances of malware embedded using known obfuscation methods. The process next inputs the obfuscation scoring features into a trained machine learning model and applies the trained machine learning model to process the document file to determine the likelihood that the document file contains a malicious macro. The resultant document is classified as safe, suspicious, or malicious. Based on the step of classifying, the safe document file is accepted into the network system. A malicious document is blocked as malicious. A suspicious document is isolated to undergo threat analysis.

In another aspect of the disclosed technology, the obfuscation scoring features include at least five of the following features describing embedded VBA macro characteristics:
macro_is_present;
macro_autoexec;
macro_execute;
macro_execute_powershell;
macro_write;
macro_has_internet_download;
macro_has_registry_access;
macro_comment_lines;
macro_code_lines;
macro_has_hex_str;
macro_olestream_count;
macro_ole_passcode;
macro_detect_sandbox;
macro_detect_virtualization;
macro_run_shell_code_in_memory;
macro_disable_security;
macro_self_modification;
macro_num_stringops;
macro_num_textfunc;
macro_num_arithfunc;
macro_num_typeconvfunc;
macro_num_fincfunc; and
macro_shannon_entropy.

In a further aspect of the disclosed technology, the document file is an MS Office document. Also, an MS Office document may be a Word document, an Excel document, or a PowerPoint document.

The disclosed technology, in the obfuscation scoring step, scores macro-related features including at least two of the VBA macro features:
createobject;
shell;
filesystem;
urldownloadtofile;
callbyname; and
detect sandbox.

In another aspect of the disclosed technology, the step of inputting to the trained machine learning model at least two features derived from the following document features:
document size;
author information;
type of document (Word/Excel/PPT);
creation or modification time and revision numbers;
number of pages;
number of paragraphs;
number of lines; and
number of characters.

The disclosed technology, in another aspect of the method, includes a secondary a secondary malware detection engine operating in tandem to increase the accuracy of the malware detection and eliminate false positives.

In the threat analysis step of the method, the document file may be isolated in a sandbox testing environment for testing one or more macros in the suspicious document file.

The present invention has the capability of detecting malicious macros that do not include known malicious data signatures. In the disclosed method, the machine learning model is a supervised machine learning model trained by machine learning algorithms through feature engineering. A selected set of features are derived a large sampling of document files. Some sampled document files include one or more malicious macros and some sampled document files include at least one non-malicious macros. A sampling of the document files are MS Office files. In one aspect of the present method a network analyst reviews the step of classifying to increase the accuracy of threat analysis.

The disclosed technology is a system for detecting document files containing malicious macros. The system includes a heuristic engine, which stores unique code patterns and data attributes found in past-analyzed malicious macros. In one aspect, using the heuristic engine, a feature set is derived of malware attributes which is used to train a machine learning model for detecting document files including macros that include those features.

The heuristic engine derives features indicative of macro malware to train a machine learning engine to create a data model, using the malware attributes of past-analyzed malicious macros. The heuristic engine stores indicators derived from malicious macros, based on the code and behavior of the past malicious macros. The present technology uses at least five features from a list of known attributes for training the machine learning model. The list of five or more features is extracted from the listing of attributes which indicate macro malware, especially obfuscated malware. In the technology disclosed, in one aspect, the system detects document files containing malicious macros, a heuristic engine that stores data and attributes from past-analyzed malicious macros, a machine learning engine including a trained malicious macro detection model. The model is trained, using the supervised machine learning method with labeled data. The training data includes documents, files and other data which are labeled as malicious or not malicious. The machine learning engine includes a supervised machine learning model trained by features derived from characteristics of malicious macros and non-malicious macros.

In another implementation, the system disclosed the heuristic engine operates in tandem with the trained machine learning model. By applying multiple detection methods in series or in tandem, the likelihood of detecting documents that contain malicious code is increased. It becomes more likely that the office classifier will more accurately classify the input documents as to threat level, increasing the likelihood of detecting macros in documents that contain malicious code.

In another aspect of the disclosed technology, a system is provided for classifying input documents in the network system to determine if at least one of said documents may include a macro having malicious code. The system includes a network, and a network interface in operable communication to the network. The disclosed technology includes an office classifier in operable communication with the network security system. The office classifier has an input means for receiving and processing document files, particularly document files which are MS Office document files. The disclosed system further includes a heuristic feature generation engine. The heuristic feature generation engine uses a list of malicious macrocode attributes selected for predicting the presence of malicious macros. The heuristic engine derives a feature list which is used to train a supervised machine learning model to predict the presence of malicious macros.

In a further aspect of the disclosed technology, the office classifier applies the machine learning model to each input document to determine the level probability that the input document may include malicious macro code. Based on this analysis, each input document is classified as safe, malicious, or suspicious. Document files classified as safe are admitted into the network; documents files classified as malicious are permanently blocked; and document files classified as suspicious are threat analyzed. The threatening analysis of suspicious files may include quarantining and transferring into a virtual environment such as a sandbox, where the malicious code may be safely analyzed.

In one aspect, the technology disclosed detects obfuscated malicious code using a trained machine learning model to predict documents having embedded malicious code without a known signature. In another aspect, the technology disclosed can be combined with signatureless-based analysis of malicious macros and OLE objects.

In another aspect, a method is disclosed for classifying input documents into a network system to determine if at least one of said documents includes a macro having malicious code. In another aspect, a method is disclosed for classifying input documents into a network system to determine if at least one of said documents includes a malicious macro. Macros are not usually observable by the user, and they make an attractive vehicle for infecting documents using MS Office documents. The disclosed technology may be used for classifying input documents in a network system includes the steps of receiving an office document into the network security system of an attached enterprise network. The document file is parsed in order to separate the metadata from the malicious payload data so that it may be analyzed. Feature engineering is used to define a set of features for detecting malicious macros and malicious OLE objects, based on features selected from a list of known characteristics and attributes possessed by files that have historically indicated malicious content. The selected features are used to train a supervised machine learning model, a model based on labeled data.

In another aspect, an office classifier receives incoming documents over a network, deconstructs those documents, and applies the machine learning algorithm to classify the documents as to threat level, as safe, suspicious, or malicious. Safe documents are allowed into the network. Suspicious documents are subjected to additional processing, including quarantining or sandboxing methods. Malicious documents are blocked from the network.

In a further aspect, it has been found the disclosed technology combines machine learning with other network security methods further increase the capability of a network security system to detect malicious macros and malicious OLE files.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method for classifying input documents in a networked system to determine if at least one of said documents may include a macro having malicious code, comprising the steps of:

repeatedly receiving a document file into a network security system;

parsing the document file to separate macro data from document payload data;

generating for the document file at least obfuscation features indicative of past instances of malware embedded in macros using known obfuscation methods;

inputting the obfuscation features to a trained machine learning model and applying the trained machine learning model to process the document file to predict the presence of a malicious macro;

using a secondary malware detection engine operating in tandem to increase the accuracy of the malware detection and eliminate false positives;

classifying a resulting document as safe, suspicious, or malicious; and based on the step of classifying, accepting a safe document into the networked system, blocking a malicious document as malicious, and isolating a suspicious document for threat analysis.

2. The method of claim 1, wherein the obfuscation features include at least five of the following features describing embedded VBA macro characteristics: macro is-present; macroautoexec; macro execute; macro_execute powershell; macrowrite; macrohasinternetdownload; macro-has registry access; macrocommentlines; macrocodelines; macrohashexstr; macro olestream count; macroolepasscode; macrodetectsandbox; macrodetectvirtualization; macrorunshellcode-in-memory; macrodisable security; macroselfmodification; macro_num_stringops; macro num textfunc; macro num arithfunc; macronum typeconvfunc; macro num fincfunc; and macro_shanonentropy.

3. The method of claim 1, wherein the document file is an MS Office document.

4. The method of claim 3, wherein the document file is one of a Word document, an Excel document, or a PowerPoint document.

5. The method of claim 3, wherein the obfuscation features are macro-related features including at least two of the following VBA macro features: createobject; shell; filesystem; urldownloadtofile; callbyname; and detect sandbox.

6. The method of claim 3, further including inputting to the trained machine learning model at least two features derived from the following document features: document size; author information; type of document (Word/Excel/PPT); creation or modification time and revision numbers; number of pages; number of paragraphs; number of lines; and number of characters.

7. The method of claim 1, wherein the threat analysis includes isolating the document file in a sandbox and testing one or more macros in the suspicious document using the sandbox.

8. The method of claim 1, wherein the malicious macros do not include known malicious data signatures.

9. The method of claim 1, wherein the machine learning model is a supervised machine learning model trained by machine learning through feature engineering, and wherein selected features are derived from a large sampling of document files, wherein some sampled document files include one or more malicious macros and some sampled document files include at least one non-malicious macros.

10. The method of claim 9, wherein the sample document files are MS Office files.

11. The method of claim 1, wherein a network analyst reviews the step of classifying to increase in the accuracy of the threat analysis.

12. The method of claim 1, wherein an office classifier classifies documents files as to maliciousness.

* * * * *